(12) United States Patent
Moser

(10) Patent No.: US 11,242,935 B2
(45) Date of Patent: Feb. 8, 2022

(54) FLOW PATH SWITCHING VALVE

(71) Applicant: Oetiker Schweiz AG, Horgen (CH)

(72) Inventor: Pascal Moser, Langnau am Albis (CH)

(73) Assignee: Oetiker Schweiz AG, Horgen (CH)

( * ) Notice: Subject to any disclaimer, the term of this patent is extended or adjusted under 35 U.S.C. 154(b) by 0 days.

(21) Appl. No.: 16/966,192

(22) PCT Filed: Feb. 14, 2018

(86) PCT No.: PCT/EP2018/053723
§ 371 (c)(1),
(2) Date: Jul. 30, 2020

(87) PCT Pub. No.: WO2019/158198
PCT Pub. Date: Aug. 22, 2019

(65) Prior Publication Data
US 2021/0041032 A1    Feb. 11, 2021

(51) Int. Cl.
| | | |
|---|---|---|
| *G05D 7/00* | (2006.01) | |
| *F16K 11/044* | (2006.01) | |
| *F16K 11/02* | (2006.01) | |
| *F16K 15/14* | (2006.01) | |

(52) U.S. Cl.
CPC .......... *F16K 11/044* (2013.01); *F16K 11/027* (2013.01); *F16K 15/141* (2013.01); *Y10T 137/2544* (2015.04)

(58) Field of Classification Search
CPC ............................................... Y10T 137/2544
See application file for complete search history.

(56) References Cited

U.S. PATENT DOCUMENTS

| | | | |
|---|---|---|---|
| 4,579,138 A | 4/1986 | Simoens | |
| 5,305,777 A * | 4/1994 | Nakamura | F15B 11/06 |
| | | | 137/102 |
| 9,133,943 B2 * | 9/2015 | Ohmura | F16K 11/07 |
| 2003/0221721 A1 | 12/2003 | Filkovski et al. | |
| 2004/0140252 A1 * | 7/2004 | Gebauer | B01D 15/16 |
| | | | 210/198.2 |

FOREIGN PATENT DOCUMENTS

| | | |
|---|---|---|
| CN | 102442072 | 5/2012 |
| DE | 2062116 | 8/1972 |
| DE | 7301612 | 4/1973 |

(Continued)

*Primary Examiner* — Robert K Arundale
(74) *Attorney, Agent, or Firm* — Simpson & Simpson, PLLC; Michael Nicholas Vranjes

(57) ABSTRACT

The flow path switching valve described herein has a valve chamber with three openings and a valve piston disposed in the valve chamber. The valve piston has a flexible diaphragm which at its circumference co-operates sealingly with an inner circumferential wall of the valve chamber. The valve piston is movable between two end positions; in a first end position, it opens a flow path between a first opening and a second opening and blocks a third opening, and in the second end position, it blocks the first opening and opens a flow path between the second opening and the third opening. The wall of the valve chamber is shaped such that in the last phase of the diaphragm movement to the first end position, the sealing contact between the diaphragm and the inner wall is undone in at least part of the circumference.

8 Claims, 3 Drawing Sheets

(56) References Cited

FOREIGN PATENT DOCUMENTS

| | | |
|---|---|---|
| DE | 2524552 | 10/1976 |
| DE | 3911866 | 8/1990 |
| DE | 69204760 | 4/1996 |
| DE | 19529072 | 2/1997 |
| DE | 102009018768 | 11/2010 |
| DE | 102012108199 | 3/2013 |
| DE | 102015102127 | 8/2016 |
| EP | 0520212 | 6/1992 |

* cited by examiner

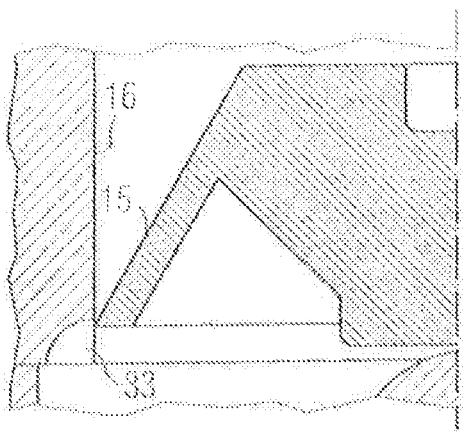
FIG 6
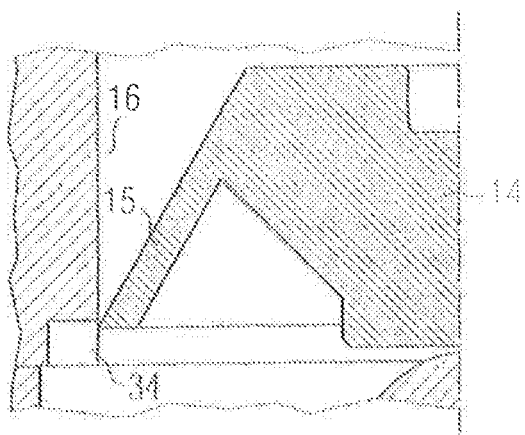
FIG 7
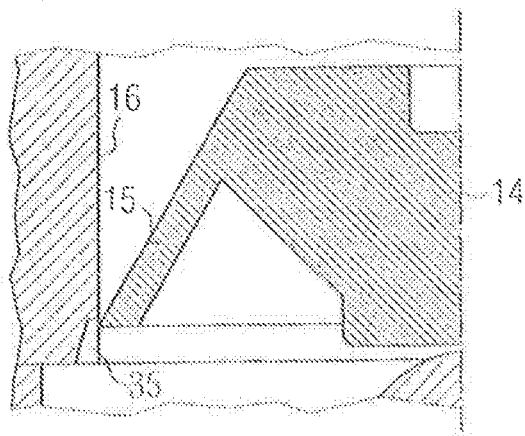
FIG 8
FIG 9
a)      b) 
c) 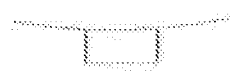     d) 

FLOW PATH SWITCHING VALVE

CROSS-REFERENCE TO RELATED APPLICATIONS

The present application is the United States National Stage Application pursuant to 35 U.S.C. § 371 of International Patent Application No. PCT/EP2018/053723, filed on Feb. 14, 2018, which application is incorporated herein by reference in its entirety.

FIELD

The present disclosure relates to a flow path switching valve that eliminates hysteresis.

BACKGROUND

A flow path switching valve is known from DE 10 2012 108 199 A1, which has a valve chamber with three openings and a valve piston disposed in the valve chamber and having a flexible diaphragm. The periphery of the diaphragm co-operates with an inner circumferential wall of the valve chamber. The valve piston is movable between two end positions, in a first end position opening a flow path between a first opening and a second opening and blocking a third opening, and in the second end position blocking the first opening and opening a flow path between the second opening and the third opening.

Switching valves of this type are used, for instance, in such a way that when air enters through the first opening the valve piston is moved by excess pressure to the first end position and blocks the third opening while the fluid is allowed to flow from the first opening past the flexible diaphragm to the second opening. When the fluid is turned off or its pressure is reduced, the higher pressure now existing at the second opening will move the valve piston to its second end position since the diaphragm now acts as a seal. In the second end position, the first opening is blocked and the air can escape through the third opening which is now open. With a correspondingly large cross-section of the third opening, the valve in this position causes quick venting.

When the valve piston is the first end position air must flow past the diaphragm. This requires a certain constant pressure in order elastically to deform the diaphragm. This loss in pressure results in a measurable hysteresis between the first and second openings of the valve chamber. Since the loss in pressure depends on dimensional tolerances and material hardness it varies for each component. In addition, it changes over time due to fatigue of material and wear. However, the elasticity of the diaphragm is essential for the valve to function.

As a result of this effect, the desired pressure in a pressure control loop is never exactly reached. If the pressure is detected downstream of the switching valve, the control loop becomes slower and the response time becomes longer due to the hysteresis, which is an additional disturbing quantity.

SUMMARY

The invention is based on the object of proving a flow path switching valve in which the hysteresis described above is removed.

In accordance with the invention, the inner circumferential wall of the valve chamber is shaped in such a manner that, in a last phase of the diaphragm movement to the first end position, the sealing contact between the diaphragm and the circumferential wall is released in at least part of the periphery. In other words, the invention provides a bypass at the valve piston that is effective when the valve piston reaches the said first end position. In this end position, the influence of the elastic diaphragm removed, thus the hysteresis described above is suppressed, without changing the basic function of the switching valve. Any wear and tolerance at the diaphragm do not influence the valve function. At the same time, the flow cross-section is increased. Due to the hysteresis being suppressed, the switching valve of the invention is faster and easier to control.

These and other objects, features, and advantages of the present disclosure will become readily apparent upon a review of the following detailed description of the disclosure, in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which:

FIGS. 3 through 8 are cross-sectional views though one half of the valve chamber and valve piston in alternative configurations; and, FIGS. 9(a) through 9(d) are diagrammatic cross-sectional representations of a groove provided in the circumferential wall of the valve chamber in a variety of cross-sectional shapes.

DETAILED DESCRIPTION

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

Figure 1:
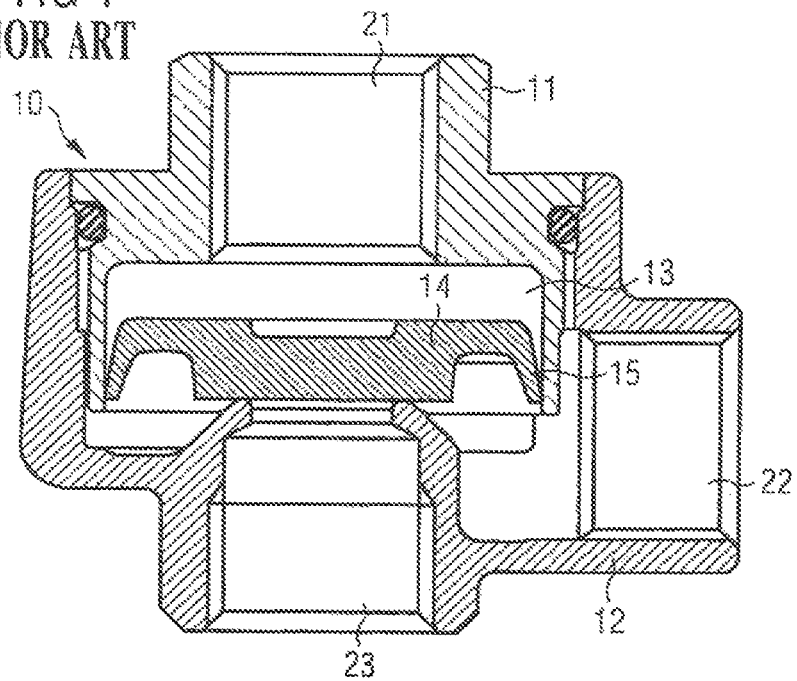
FIG. 1 is a cross-sectional view of a quick venting valve.

The quick venting valve illustrated in FIG. 1 has body 10 which in the example shown is made of two body parts 11 and 12 tightly interconnected via an O-ring. Valve chamber 13 is formed in body part 11. Piston 14 made of synthetic material and having flexible diaphragm 15 is movable within valve chamber 13 in a perpendicular direction according to FIG. 1.

Valve chamber 13 has in upper body part 11 first opening 21 for connection to a pressurized air source (not shown) and in lower body part 12 second, laterally disposed opening 22 for connection to a pressurized air cylinder or the like (not shown) and lower third opening 23 for quick venting to the atmosphere.

Valve piston 14 is movable between a first end position, which is the one shown, in which it blocks third opening 23, and second end position (not shown in FIG. 1) in which it abuts the upper wall of valve chamber 13 and blocks first opening 21. In the first end position, valve piston 14 is held by the excess pressure existing at first opening 21.

In this position, prior art valves permit air to flow around flexible diaphragm 15 and reach the cylinder connected to opening 22.

When the pressure at opening 21 is reduced below that existing at opening 22, valve piston 14 is pushed into the second end position (not shown) in which it prevents air from flowing out through opening 21 whereas air from opening 22 connected to the cylinder is allowed to escape quickly to the atmosphere through larger opening 23.

Figure 2:
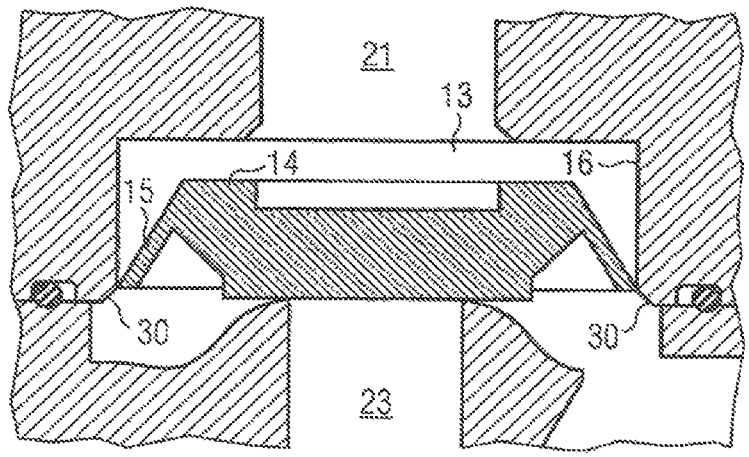
FIG. 2 is an enlarged cross-sectional view of the valve chamber and the valve piston disposed therein.
Figure 3:
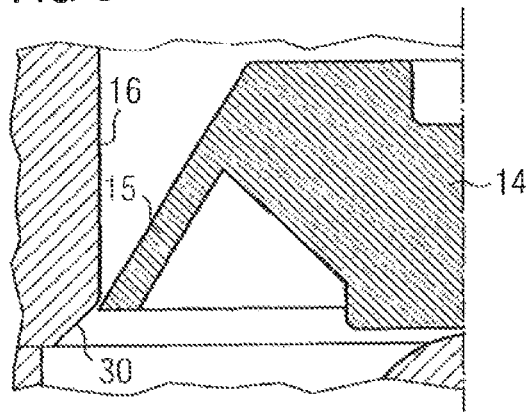

In the embodiment of the invention shown in FIGS. 2 and 3, the lower edge of circumferential wall 16 of the valve chamber is formed with chamfer 30 which is so disposed that diaphragm 15 of valve piston 14 when reaching the first end position is spaced from circumferential wall 16 to open a bypass connection between first opening 21 and second opening 22, thereby suppressing the hysteresis that exists in the prior art.

Diaphragm 15 is comparatively stiff. Valve piston 14 has nearly no inner friction and is moved by a very small pressure. When it reaches the bypass the air is allowed to flow past diaphragm 15 without any loss of pressure and thus free of hysteresis. In contrast, in the prior art, the resistance of the diaphragm must always be overcome.

Figure 4:
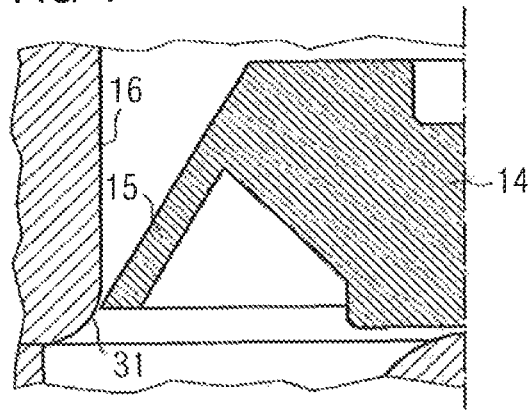

In the embodiment of FIG. 4, the bypass is formed by radius 31 which starts at the location where diaphragm 15 is just before it reaches the first end position. In this case again, the diaphragm end position is no longer in sealing contact with circumferential wall 16 of valve chamber 13. One advantage of this embodiment resides in the uniform pressure relief of diaphragm 15 and the large cross-sectional area for the air flow that is also achieved. Compared to chamfer 30 of FIGS. 2 and 3, radius 31 forms a smoother transition which contributes to the valve's service life.

Figure 5:
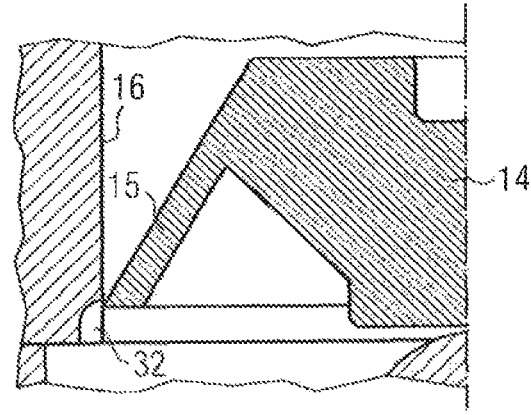

In FIG. 5, the bypass is shaped as groove 32 in circumferential wall 16 of the valve chamber. It is also possible to provide a plurality of parallel grooves or parallel annular grooves arranged so that diaphragm 15 ceases to contact circumferential wall 16 only shortly before reaching the first end position.

In the embodiments of FIGS. 6-8, a plurality of circumferentially distributed notches 33, 34, or 35 are formed at the lower end of circumferential wall 16 of the valve chamber, each notch extending over only part of the circumference, the notches being again disposed at a location which diaphragm 15 reaches only shortly before the first end position. Alternatively, a single notch, for example, notch 33, 34, or 35, may be provided. In the axial section, the notches may be in the shape of part of a circle (e.g., notch 33 in FIG. 6), rectangular (e.g., notch 34 in FIG. 7), trapezoidal (e.g., notch 35 in FIG. 8) or otherwise.

As indicated in FIG. 9, the cross-section of notches 33, 34, and 35 may be trough-shaped a), wedge-shaped b), rectangular c), or semicircular d).

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE NUMERALS

10 Body
11 Body part
12 Body part
13 Valve chamber
14 Valve piston
15 Diaphragm
16 Circumferential wall
21 First opening
22 Second opening
23 Third opening
30 Chamfer
31 Radius
32 Groove
33 Notch
34 Notch
35 Notch

What is claimed is:

1. A flow path switching valve, comprising:
   a valve chamber including:
      a first opening;
      a second opening;
      a third opening; and,
      an inner circumferential wall comprising a first end, a second end forming the first opening, and an enlarged diameter portion at the first end; and,
   a valve piston arranged in the valve chamber, the valve piston being movable between a first end position and a second end position and including a flexible diaphragm operatively arranged to sealingly engage the inner circumferential wall;
   wherein:
      the valve piston in the first end position:
         opens a flow path between the first opening and the second opening;
         blocks the third opening; and,
         is at least partially aligned with the first end;
      the valve piston in the second end position:
         blocks the first opening;
         opens a flow path between the second opening and the third opening; and,
         is aligned with the second end; and,
      the enlarged diameter portion comprises a first diameter and the diaphragm in a non-deformed state comprises a second diameter, the second diameter being less than the first diameter.

2. The flow path switching valve as recited in claim 1, wherein the enlarged diameter portion is conical.

3. The flow path switching valve as recited in claim 1, wherein the enlarged diameter portion is curvilinear.

4. The flow path switching valve as recited in claim 1, wherein the enlarged diameter portion is a radially outward extending groove, the groove comprising a curvilinear portion and a linear portion.

5. The flow path switching valve as recited in claim 1, wherein the enlarged diameter portion is a notch, comprising:
   a first linear surface arranged perpendicular to the inner circumferential wall; and,
   a second linear surface arranged non-parallel to the inner circumferential wall, the second linear surface connected to the first linear surface and extending to the first end.

6. The flow path switching valve as recited in claim 1, wherein the enlarged diameter portion is a notch, comprising:
   a first linear surface arranged perpendicular to the inner circumferential wall; and,
   a second linear surface arranged parallel to the inner circumferential wall, the second linear surface connected to the first linear surface and extending to the first end.

7. The flow path switching valve as recited in claim 1, wherein the enlarged diameter portion is a concave curvilinear notch.

8. A flow path switching valve, comprising:
   a valve chamber including:
      a first opening;
      a second opening;
      a third opening; and,
      an inner circumferential wall comprising a first end, a second end forming the first opening, a first diameter portion, and a second diameter portion, wherein the second diameter portion extends radially outward from the first diameter portion; and,
   a valve piston arranged in the valve chamber, the valve piston being movable between a first end position and a second end position and including a flexible diaphragm operatively arranged to sealingly engage the first diameter portion and sealingly disengage the second diameter portion;
   wherein:
      the valve piston in the first end position:
         opens a flow path between the first opening and the second opening;
         blocks the third opening; and,
         is at least partially aligned with the first end; and,
      the valve piston in the second end position:
         blocks the first opening;
         opens a flow path between the second opening and the third opening; and,
         is aligned with the second end;
      the diaphragm in a non-deformed state comprises a first diameter and the second diameter portion comprises a second diameter, the second diameter being greater than the first diameter.

* * * * *